United States Patent [19]

Lee

[11] 4,399,251

[45] Aug. 16, 1983

[54] COMPOSITIONS COMPRISING A THERMOPLASTIC RESIN AND AN OLEFIN MOLD RELEASE AGENT

[75] Inventor: Garland G. Lee, Mt. Vernon, Ind.

[73] Assignee: General Electric Company, Mt. Vernon, Ind.

[21] Appl. No.: 327,946

[22] Filed: Dec. 7, 1981

[51] Int. Cl.³ .............................................. C08L 69/00
[52] U.S. Cl. .................................... 524/481; 524/560; 524/562; 524/565; 524/567; 524/575; 524/590; 524/601; 524/603; 524/606; 524/609; 524/508; 524/570

[58] Field of Search ............... 524/481, 611, 560, 565, 524/567, 562, 575, 590, 601, 603, 606, 609, 570; 525/468; 528/498

[56] References Cited

U.S. PATENT DOCUMENTS 2,924,584  2/1960  Wolinski ........................... 524/481

FOREIGN PATENT DOCUMENTS 56-45944  4/1981  Japan ................................. 525/468

*Primary Examiner*—Theodore E. Pertilla
*Attorney, Agent, or Firm*—Martin B. Barancik

[57] ABSTRACT

A composition comprising a thermoplastic resin and a mold release effective amount of an olefin.

20 Claims, No Drawings

COMPOSITIONS COMPRISING A THERMOPLASTIC RESIN AND AN OLEFIN MOLD RELEASE AGENT

BACKGROUND OF THE INVENTION

Useful articles from various thermoplastic resins have been prepared from molds for many years. Injection molding provides a convenient way for preparing various articles from thermoplastic resins, particularly objects of a relatively intricate nature. In order to injection mold articles in an economic manner the mold resident cycle time should be kept to a minimum. This shorter cycle time provides a shorter resin heat period with consequently less thermal damage to the resin itself and/or less thermal promoted interaction between the resin and various additives present in the resin. In order to accomplish a release of the resin from the mold, various mold release agents have been found which provide for a release of the resin with lower ejection pressure. Such an agent should be chemically compatible with the resin as measured by the usual characteristics of the resin under normal conditions and heat treatments.

Of the thermoplastic resins which find a mold release agent useful from time to time one of the most sensitive to chemical interaction are the polycarbonates. The carbonate bond is susceptible to bond cleavage, for example, hydrolysis from the usual sources. Additionally, because of the high temperature at which extrusion and injection molding occur, it is also important to maintain the thermal stability of the composition. Consequently the mold release agent should itself be thermally stable at the normal processing conditions and also not interact with the resin under these conditions. A new class of mold release for certain thermoplastic resins and polycarbonate in particular has been discovered.

SUMMARY OF THE INVENTION

In accordance with the invention, there is a composition comprising a thermoplastic resin and an injection mold release effective amount of an olefin having from about 14 to about 46 carbon atoms, inclusive.

Examples of various thermoplastic resins which are within the invention include aromatic carbonate polymers, polyesters, polyarylates, copolyester-carbonates, polysulfones, polyethersulfones, polyamides, polysulfindes, polyacrylates, polyurethanes, polyolefins, polyvinylhalides, acrylonitrile butadiene styrene, butadiene styrenes, methacrylate butadiene styrene, and the like and blends of the above with each other or a further thermoplastic resin. The preferred thermoplastic resin is an aromatic polycarbonate.

Aromatic polycarbonates are prepared in the conventional manner by reacting a dihydric phenol with a carbonate precursor in an interfacial polymerization process. Typical of some of the dihydric phenols that may be employed in the practice of this invention are 2,2-bis(4-hydroxyphenyl)propane, i.e. bisphenol-A, (2,2-bis(4-hydroxy-3-methylphenyl)propane, 4,4-bis(4-hydroxyphenyl)heptane, 2,2-(3,5,3',5'-tetrachloro-4,4'-dihydroxydiphenyl)propane, 2,2-(3,5,3',5'-tetrabromo-4,4'-dihydroxydiphenyl)propane, (3,3'-dichloro-4,4'-dihydroxyphenyl)methane, bis 4-hydroxy phenyl sulfone and bis 4-hydroxy phenyl sulfide. Other dihydric phenols of the bisphenol type are also available and are disclosed in U.S. Pat. Nos. 2,999,835; 3,028,365 and 3,334,154. Bisphenol-A is preferred.

It is, of course, possible to employ two or more different dihydric phenols or a copolymer of a dihydric phenol with a glycol or with hydroxy or acid terminated polyester, or with a dibasic acid in the event a carbonate copolymer or interpolymer rather than a homopolymer is desired for use in the preparation of the aromatic carbonate polymers of this invention. Also employed in the practice of this invention may be blends of any of the above materials to provide the aromatic carbonate polymer.

The carbonate precursor may be either a carbonyl halide, a carbonate ester or a haloformate. The carbonyl halides which can be employed herein are carbonyl bromide, carbonyl chloride and mixtures thereof. Typical of the carbonate esters which may be employed herein are diphenyl carbonate, di-(halophenyl) carbonates such as di(chlorophenyl) carbonate, di-(bromophenyl) carbonate, di(trichlorophenyl) carbonate, di-(tribromophenyl) carbonate, etc. di-(alkylphenyl) carbonate such as di(tolyl) carbonate, etc., di-(naphthyl) carbonate, di-(chloronaphthyl) carbonate, phenyl tolyl carbonate, chlorophenyl chloronaphthyl carbonate, etc., or mixtures thereof. The haloformates suitable for use herein include bis-haloformates of dihydric phenols (bischloroformates of hydroquinone), or glycols (bishaloformates of ethylene glycol, neopentyl glycol, polyethylene glycol, etc.). While other carbonate precursors will occur to those skilled in the art, carbonyl chloride, also known as phosgene, is preferred.

The polycarbonate polymers of this invention may be prepared by employing a molecular weight regulator, an acid acceptor and a catalyst. The molecular weight regulators which can be employed in carrying out the process of this invention include monohydric phenols such as phenol, chroman-1, paratertiarybutylphenol, parabromophenol, primary and secondary amines, etc. Preferably, phenol is employed as the molecular weight regulator.

A suitable acid acceptor may be either an organic or an inorganic acid acceptor. A suitable organic acid acceptor is a tertiary amine and includes such materials as pyridine, triethylamine, N,N-dimethylaniline, tributylamine, etc. The inorganic acid acceptor may be one which can be either a hydroxide, a carbonate, a bicarbonate, or a phosphate or an alkali or alkaline earth metal.

The catalysts which are employed herein can be any of the suitable catalysts that aid the polymerization of bisphenol-A with phosgene. Suitable catalysts include tertiary amines such as, for example, triethylamine, tripropylamine, N,N-dimethylaniline, quaternary ammonium compounds such as, for example, tetraethylammonium bromide, cetyl triethyl ammonium bromide, tetra-n-heptyl-ammonium iodide, tetra-n-propyl ammonium bromide, tetra-methylammonium chloride, tetramethyl ammonium hydroxide, tetra-n-butylammonium iodide, benzyltrimethylammonium chloride and quaternary phosphonium compounds such as, for example, n-butyltriphenyl phosphonium bromide and methyltriphenyl phosphonium bromide.

Also included herein are branched polymers wherein a polyfunctional aromatic compound is reacted with the dihydric phenol and carbonate precursor to provide a thermoplastic randomly branched polycarbonate polymer.

These polyfunctional aromatic compounds contain at least three functional groups which are carboxyl, carboxylic anhydride, haloformyl or mixtures thereof. Examples of these poly-functional aromatic compounds which may be employed in the practice of this invention include: trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride and the like. The preferred poly-functional aromatic compounds are trimellitic anhydride or trimellitic acid, or their haloformyl derivatives.

Also, included herein are blends of a linear polymer and a branched polymer.

The method of preparing the thermoplastic resins other than the aromatic polycarbonates are equally well known, consequently no detailed procedures of preparation are necessary.

The olefins useful in this invention are olefins having from fourteen (14) to about forty-six (46) carbon atoms, inclusive. The olefins may have the unsaturation anywhere in the molecule but are preferably unsaturated at the terminal, alpha, position. Normal olefins are preferred; however, slight branching of the molecule can occur. Generally, no more than about ten (10) percent of the total number of carbon atoms should be in a branched position, that is for example, for a branched $C_{40}$ olefin, no more than four (4) carbon atoms should be in branch as opposed to the straight portion of the molecule. The carbon atoms which are in the branched position need not be in only one branch but can each make a separate methyl branch. The unsaturation can be in the branched portion of the molecule but is preferably in the straight portion.

Examples of the alpha olefins are butadecene-1, octadecene-1, hexatricontene-1 ($C_{36}$), tetracontene-1 ($C_{40}$) and tetratetracontene-1 ($C_{44}$), 5-npropyltricontene-1 ($C_{33}$), 2,6-dimethyleicosene-1 ($C_{22}$), and 4-methyl, 12-ethyltetracontene-1 ($C_{43}$). Examples of the internal olefins are butadecene-3, octacosene-7, hexatricontene-12, 4-ethyleneyleicosane ($C_{22}$) and 2,10-dimethyltetracontene-6.

The olefins are commercially available from Gulf, Shell, and Ethyl Corp.

An effective mold releasing amount of the olefin is employed in the thermoplastic composition. Any amount of olefin which reduces the amount of pressure needed to eject the article from the injection mold and obtain an unblemished article in comparison to the pressure needed to eject the thermoplastic composition control is an effective mold releasing amount. In general, effective amounts of the olefin are from about 0.01 to about 3.0 weight percent, based on the quantity of thermoplastic resin present, preferably from about 0.1 to about 0.4 weight percent. The olefin can be added to the resin in the normal manner that the other additives are added, for example, in the dry or liquid stage and coextruded or in a solvent and melt extruded with the resin.

Other additives in common use in the thermoplastic resins may also be employed. For example with respect to aromatic polycarbonate, additives which are commonly known to stabilize the resin thermally such as a phosphite can be employed. Hydrolytic stabilizers such as epoxides may also be employed as well as agents which are flame retardants, drip inhibitors, ductility enhancer, antioxidant, solvent resistance enhancer, ultraviolet light stabilizers and various inert fillers. Active fillers and pigments can be used with passivating agents and treatments. Impact modifiers may also be present in the composition. Examples of such modifiers are the polyolefins and the acrylate copolymers, particularly the core shell polymers such as Rohm and Haas Acryloid KM330, see U.S. Pat. No. 4,096,202.

Below are specific examples of the invention. The examples are intended to illustrate but not narrow the inventive concept. All percentages of the additives are in weight percent of the thermoplastic resin.

EXAMPLE 1

In all the ensuing examples the aromatic polycarbonate is Lexan® 140, a polymer produced by reacting bisphenol-A and phosgene. The mold release agent was dry formulated into the polycarbonate at levels of 0.3 weight percent unless otherwise stated. Also present in the composition is 0.03 weight percent of a phosphite stabilizer.

EXAMPLE 2

In an injection molding machine with a 4 ounce shot capacity, various mold release agents were tested. The mold used was a 3"×3" box with a 1½" wall height. It had ejector pins at four corners with two of the pins being attached to strain gauge transducers for measuring the part ejection pressure. The mold was designed with very little draft so that the part would tend to stick to the core unless mold release is used. To vary the amount of shrinkage on the core, the temperature of the stationary and moving mold halves could be varied.

Below are the ejector pin pressure values in pounds per square inch in arithmetic mean plus or minus two standard deviations for the various potential mold release agents tested.

TABLE I

| MOLD RELEASE AGENT | EJECTOR PIN PRESSURE PSI $\bar{x} \pm 2$ | |
|---|---|---|
| | #1 | #2 |
| PETS[1] | 5725 ± 184 | 5820 ± 206 |
| BUTADECENE-1 | 5440 ± 253 | 1815 ± 182 |
| HEXDECENE-1 | 5400 ± 121 | 1665 ± 125 |
| OCTADECENE-1 | 4995 ± 264 | 1520 ± 139 |
| EICOSENE-1 | 4790 ± 766 | |

[1]Pentaerythritol tetrastearate, a commercially employed mold release agent used as the control.

The values from the above table are significant. Polycarbonate having PETS, a commercially employed mold release agent ester requires a very high amount of pressure to effect release from the mold. However, the tested olefins all show substantially reduced ejector pin pressures. These agents are effective mold release agents.

EXAMPLE 3

In a like manner as in Example 1 samples are prepared with olefin having internal unsaturation or branching in accordance with the invention. Under the experimental conditions of Example 2, similar results will be obtained.

EXAMPLE 4

The viscosity properties of olefin containing pellets were compared with PETS containing pellets. Also present in the pellets were a phosphite stabilizer and an exoxide stabilizer. The pellets were extruded at 500° F.

The viscosity measurements were at 572° F. and run under the conditions of ASTM D1238.

Below are the results.

TABLE II

| EXAMPLE | MELT FLOW g/10 MIN. DWELL TIME | |
|---|---|---|
| | 6 MIN | 15 MIN |
| Eicosene-1 | 9.82 | 10.10 |
| Butadecene-1 and Hexadecene | 9.97 | 9.94 |
| PETS | 9.82 | 10.20 |

These results show that there is essentially no thermally induced degradation of the invention compositions under these conditions in comparison to the PETS composition. All the values are within experimental error. When these pellets were made into standard sized color chips, the percent light transmission and percent haze were essentially the same or better for the invention compositions in comparison with the PETS composition.

What is claimed is:

1. A composition comprising a thermoplastic resin selected from the group consisting of aromatic carbonate polymer, polyester, polyarylate, copolyestercarbonate, polysulfone, polyethersulfone, polyamide, polysulfide, polyacrylate, polyurethane, polyvinylhalide, acrylonitrile butadiene styrene, butadiene styrene and methacrylate butadiene styrene and a mold release effective amount of a mono-olefin of from about fourteen to about forty-six carbon atoms inclusive.

2. A composition in accordance with claim 1 wherein the thermoplastic resin is an aromatic polycarbonate.

3. A composition in accordance with claim 2 wherein the olefin is from about sixteen to about thirty carbon atoms, inclusive.

4. A composition in accordance with claim 2 wherein the olefin is an alpha olefin.

5. A composition in accordance with claim 4 wherein the olefin is a normal olefin.

6. A composition in accordance with claim 2 wherein the olefin is a branched olefin.

7. A composition in accordance with claim 6 wherein the olefin has no more than about ten percent branching.

8. A composition in accordance with claim 5 wherein the olefin has 14, 16, 18 or 20 carbon atoms.

9. A composition in accordance with claim 2 wherein the olefin is present in from about 0.01 to about 3.0 weight percent based on the quantity of aromatic polycarbonate.

10. A composition in accordance with claim 9 wherein the olefin is present in from about 0.1 to about 0.4 weight percent.

11. A composition in accordance with claim 2 wherein an effective amount of an ultraviolet stabilizer is present.

12. A composition in accordance with claim 2 wherein an effective amount of a flame retardant is present.

13. A composition in accordance with claim 2 wherein an effective amount of a hydrolytic stabilizer is present.

14. A composition in accordance with claim 2 wherein an effective amount of a drip inhibitor is present.

15. A composition in accordance with claim 2 wherein an effective amount of a thermal stabilizer is present.

16. A composition in accordance with claim 2 wherein an effective amount of a filler is present.

17. A composition in accordance with claim 2 wherein an effective amount of an active filler is present.

18. A composition in accordance with claim 2 wherein an effective amount of a pigment is present.

19. A composition in accordance with claim 2 wherein an effective amount of an impact modifier is present.

20. A composition in accordance with claim 2 wherein the aromatic carbonate polymer is derived from bisphenol A.

* * * * *